Sept. 18, 1945.   J. F. WALLACE   2,385,045
PACKING RING FOR SHOCK ABSORBING STRUTS
Filed Aug. 26, 1943
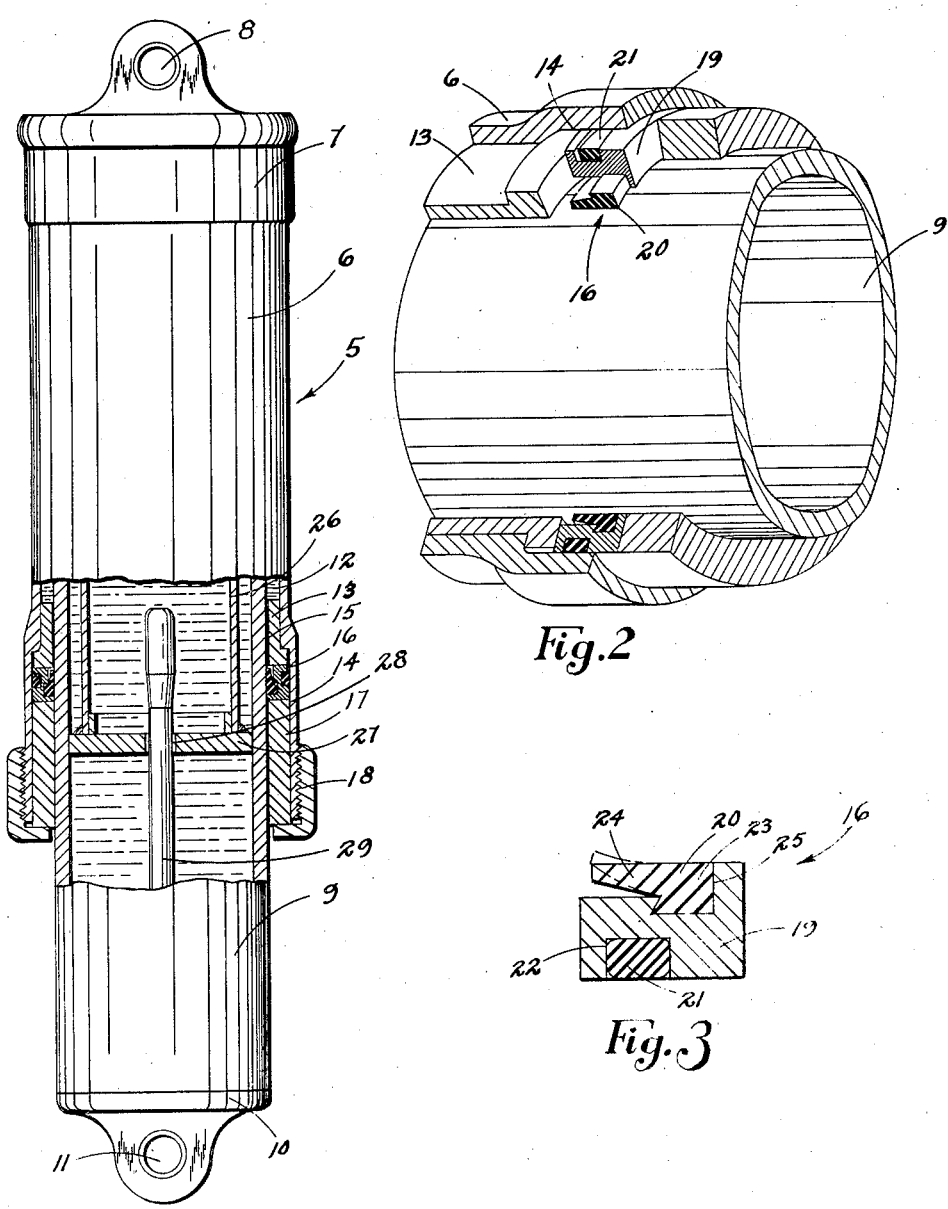
INVENTOR
JOHN F. WALLACE
BY
ATTORNEY Patented Sept. 18, 1945

2,385,045

UNITED STATES PATENT OFFICE 2,385,045

PACKING RING FOR SHOCK ABSORBING STRUTS

John F. Wallace, University Heights, Ohio, assignor to The Cleveland Pneumatic Tool Company, Cleveland, Ohio, a corporation of Ohio Application August 26, 1943, Serial No. 500,093

3 Claims. (Cl. 286—26)

The present invention relates broadly to shock absorbing struts for airplanes, but more particularly to improvements in packing rings for use therewith.

An important object of the invention resides in the provision of a novel form of packing ring which will permit a more improved seal between the movable parts of a shock absorbing strut or the like.

A more specific object of the invention is to provide a packing in the form of a ring fabricated with a lip portion during the molding thereof, said lip portion normally diverging at an angle from the body of the ring so as to afford a tight fit when used as a packing between two movable members.

A further object of the invention is to form the lip packing in such a manner that the liquid used in the shock absorbing strut will be discharged in back of the lip so as to effect a pressure seal thereon.

A still further object of the invention resides in the provision of a packing ring, the construction of which eliminates the necessity of using a plurality of packings and oversized stuffing box such as at present used with airplane shock absorbers.

Other objects and advantages more or less ancillary to the foregoing reside in the specific construction and aggroupment of the elements peculiar to this structure, as will become apparent from a more complete examination of this specification.

In the drawing which illustrates the invention:

Fig. 1 is an elevational view partly in section of a shock absorbing strut embodying the invention.

Fig. 2 is a view partly in section and partly in elevation illustrating the manner of supporting the packing ring between the elements of the shock absorbing strut.

Fig. 3 is an enlarged detailed sectional view of the packing ring and its supporting housing.

Referring to the drawing for a more detailed description thereof in which like reference characters indicate like parts in the several views, the shock absorbing strut indicated generally by the reference numeral 5 includes an upper cylinder 6 closed at its upper end by a cap 7, apertured as at 8 for attachment to the fuselage of the airplane. The cap 7 is secured to the cylinder 6 by any suitable means such as a weld or the like, while the lower end of the cylinder is open to enable free passage of a lower cylinder 9 telescopically mounted within the cylinder 6. The lower end of the cylinder 9 is closed by a cap 10 which is apertured as indicated at 11 for attachment to the landing wheel or ground engaging member of the craft. As in conventional practice, the lower cylinder is materially smaller than the upper one to form between them an annular chamber 12 closed at its lower end by a bushing 13 engaging the bottom of a counterbore 14 forming the lower end of the upper cylinder, which bushing forms a sliding bearing between the two cylinders. The inner diameter of the bushing 13 is slightly larger than the outer diameter of the lower cylinder 9 to provide a passageway 15 for the flow of liquid from the annular chamber 12 for a purpose to be hereinafter more fully described. The counterbore 14 also accommodates the packing means generally indicated at 16 which is held in position by means of the bearing 17 and flanged nut 18, said nut being threadedly secured to the lower end of the upper cylinder as clearly shown in Fig. 1 of the drawing.

The internal construction of the shock absorber forms no part of the present invention and is of the type disclosed in Patent No. 2,213,823 issued September 3, 1940. As in the patent, the upper end of the lower cylinder 9 is closed by a piston, not shown, which piston closely fits within the cylinder 6 and acts as a sliding bearing for the lower cylinder. The annular chamber 12 receives its supply of liquid from the cylinder 6 during the action of the shock absorber when the craft is landing or taxiing. Internally of the cylinder 6 and in coaxial alignment therewith, there is a check tube 26 which tube extends downwardly into the cylinders 6 and 9 and has its lower end carrying a piston 27 which is provided with a central orifice 28 through which is free to slide a metering pin 29 carried by the cap 10 of the lower cylinder 9.

The packing means 16 includes a metal housing of annular formation 19 shaped to accommodate on opposed sides thereof the packing rings 20 and 21. The packing rings 20 and 21 are preferably formed of rubber, the ring 21 being cylindrical in cross-section prior to insertion in the recess 22 and is of the type illustrated in Patent No. 2,180,795 issued November 21, 1939. The packing ring 20 which is of improved construction comprises an annular body 23 and lip portion 24. As more particularly shown in Figs. 2 and 3 of the drawing, the lip portion tapers away from the body of the ring and when initially fabricated is of substantially the shape illustrated in dotted lines in Fig. 3. The housing 19 is formed with a recess 25 for accommodating the ring 20, and said ring is held within said recess by being vulcanized at all points of contact therewith. As is to be understood, prior to placement of the housing 19 within the counterbore 14, the lip portion 24 diverges outwardly in the dotted line position shown, but as soon as contact is made with the inner cylinder 9, said lip portion will snugly fit the outer wall of the cylinder in the manner shown.

When the parts are in the position illustrated in Fig. 1, the upper end of the lip portion 24 is adjacent to the lower end of the passageway 15 so that the liquid within the annular chamber 12 will flow through said passageway and exert a pressure on the lip which is equal to the air pressure in the upper cylinder. Thus there is provided a packing ring which will effect a pressure seal preventing leakage of any liquid from the upper chamber down around the lower chamber. The packing ring 21 is an additional sealing means and is employed to seal the inner diameter of the counterbore 19.

Since the liquid within the cylinder 9 is always under pressure, the liquid within the annular chamber 12 will also be under pressure at all times. The pressure on the liquid increases or decreases during compression and extension of the shock absorber. However, sufficient pressure is present on the body of liquid within the chamber 12 to maintain a pressure seal on the lip of the packing ring which will substantially preclude the escapement of any liquid from said chamber. Since the packing ring 20 is fixedly secured by being vulcanized to the housing 19, there is very little possibility of said ring becoming displaced during movement of the cylinders.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a shock absorber, inner and outer telescoping members containing pressure fluid, means for sealing the sliding joint between said members comprising an annular housing carried by the outer member and held therein against movement, said housing having flat end walls and cylindrical inner and outer walls, a resilient packing ring assembled upon the inner wall of the housing and fixed thereto, said ring having an integral lip free of the housing extending endwise thereof and terminating short of the adjacent end wall, said lip decreasing in thickness toward its free edge and biased inwardly away from said housing for contact with the inner telescoping member.

2. In a shock absorber, inner and outer telescoping members containing pressure fluid, means for sealing the sliding joint between said members comprising an annular housing carried by the outer member and held therein against movement, said housing having flat end walls and cylindrical inner and outer walls, a resilient packing ring assembled upon the inner wall of the housing and vulcanized thereto, said ring having an integral lip free of the housing extending endwise thereof and terminating short of the adjacent end wall, said lip decreasing in thickness toward its free edge and biased inwardly away from said housing for contact with the inner telescoping member.

3. In a shock absorber, inner and outer telescoping members containing pressure fluid, means for sealing the sliding joint between said members comprising an annular housing carried by the outer member and held therein against movement, said housing having flat end walls and cylindrical inner and outer walls, a resilient packing ring assembled upon the inner wall of the housing and fixed thereto, said ring having an integral lip free of the housing extending endwise thereof and terminating short of the adjacent end wall, said lip decreasing in thickness toward its free edge and biased inwardly away from said housing for contact with the inner telescoping member, and said housing carrying a second resilient packing ring on its outer side disposed opposite the free lip of said first named packing ring.

JOHN F. WALLACE.